United States Patent
Agne et al.

(10) Patent No.: US 7,376,858 B2
(45) Date of Patent: May 20, 2008

(54) SYSTEM COMPRISING A PLURALITY OF SLAVE DEVICES COUPLED TO A BIDIRECTIONAL RING BUS AND OUTPUTTING A FIRST AND SECOND CLOCK SIGNAL FROM A FIRST AND SECOND SLAVE DEVICE RESPECTIVELY AND SELECTING EITHER THE FIRST OR SECOND CLOCK SIGNAL AT EACH SLAVE DEVICE

(75) Inventors: Werner Agne, Röthenbach (DE); Werner Blumenstock, Weisendorf (DE); Jochen Schlinkert, Höchstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 298 days.

(21) Appl. No.: 11/042,870

(22) Filed: Jan. 25, 2005

(65) Prior Publication Data

US 2005/0188237 A1    Aug. 25, 2005

(30) Foreign Application Priority Data

Jan. 30, 2004    (DE) .................. 10 2004 004 843

(51) Int. Cl.
G06F 1/00 (2006.01)
G06F 1/04 (2006.01)
G06F 11/00 (2006.01)
G06F 15/16 (2006.01)

(52) U.S. Cl. .................. 713/600; 714/2; 714/100; 713/400; 713/500; 709/248

(58) Field of Classification Search ............. 713/400, 713/500, 600; 714/2, 100; 709/248
See application file for complete search history.

(56) References Cited

U.S. PATENT DOCUMENTS

| | | | | |
|---|---|---|---|---|
| 4,785,394 | A * | 11/1988 | Fischer | 710/114 |
| 5,947,023 | A | 9/1999 | Bohrer et al. | |
| 5,988,846 | A * | 11/1999 | Flamm et al. | 700/8 |
| 6,023,771 | A * | 2/2000 | Watanabe | 713/501 |
| 6,144,675 | A * | 11/2000 | Wakabayashi et al. | 370/516 |
| 6,417,643 | B1 | 7/2002 | Shiba et al. | |
| 6,675,307 | B1 * | 1/2004 | Heitkamp et al. | 713/401 |
| 7,013,328 | B2 * | 3/2006 | Monse et al. | 709/208 |
| 7,024,121 | B2 * | 4/2006 | Rikitake et al. | 398/154 |
| 2002/0037017 | A1 | 3/2002 | Kiesel et al. | |

(Continued)

FOREIGN PATENT DOCUMENTS

DE    41 27 531 A1    9/1992

(Continued)

OTHER PUBLICATIONS

Profibus International Support Center, "Profibus Technologie und Anwendung", Oct. 2002, Karlsruhe, Germany, pp. 1-42.

*Primary Examiner*—Mark Connolly

(57) ABSTRACT

The objective is to reduce the downtime of a printing system in the printing industry. Provision is therefore made to supply the drive regulators (3) of a printing system (1) simultaneously with a plurality of clock signals. Each of the drive regulators (3) independently selects one of the clock signals for synchronization. In the event of failure of a signal source, the printing system is not interrupted but the drive regulators (3) switch automatically to the clock still present.

5 Claims, 2 Drawing Sheets

U.S. PATENT DOCUMENTS

2003/0018809 A1* 1/2003 Agne .................. 709/238

FOREIGN PATENT DOCUMENTS

| DE | 196 26 287 A1 | 2/1997 |
| EP | 0 816 963 A2 | 1/1998 |
| JP | 05014383 A * | 1/1993 |
| WO | WO 97/04614 A1 | 2/1997 |
| WO | WO 97/11848 A1 | 4/1997 |
| WO | WO 02/27990 A2 | 4/2002 |

* cited by examiner

SYSTEM COMPRISING A PLURALITY OF SLAVE DEVICES COUPLED TO A BIDIRECTIONAL RING BUS AND OUTPUTTING A FIRST AND SECOND CLOCK SIGNAL FROM A FIRST AND SECOND SLAVE DEVICE RESPECTIVELY AND SELECTING EITHER THE FIRST OR SECOND CLOCK SIGNAL AT EACH SLAVE DEVICE

CROSS REFERENCE TO RELATED APPLICATIONS

This application claims priority to the German application No. 10 2004 004 843.6, filed Jan. 30, 2004 and which is incorporated by reference herein in its entirety.

FIELD OF INVENTION

The present invention relates to a bus system for controlling a component of a printing machine with a plurality of slaves as bus components and a clock generator to output a first clock signal and a second clock signal to the plurality of slaves. The present invention also relates to a corresponding method for operating a bus system.

SUMMARY OF THE INVENTION

A printing system comprises a plurality of printing rollers, which are preferably individually activated. To this end a drive regulator is required for each printing cylinder or each printing roller. The drive regulators are activated by means of a clocked bus system.

The failure of a printing system can be an enormous economic problem for an enterprise. Therefore where possible more than one synchronization clock master is used in the clocked bus system for activating the drive regulators. Drive controllers or regulators are used as the synchronization clock masters. If necessary, e.g. if a synchronization clock master fails, it is possible to switch between masters. Such a switching operation is effected for example using a polling list within the synchronization group.

It is also known from the publication EP 0 816 963 A2 that it is possible to switch between the clock masters using a priority list. This priority list can also run cyclically, so that the global synchronization clock is generated by all the drive controllers one after the other for a specific time interval.

However switching between synchronization clock masters requires a specific minimum period. In some circumstances the printing system fails during this switching period.

The object of the present invention is therefore to minimize the downtime of a printing system when switching to another clock master.

According to the invention this object is achieved by a bus system for controlling a component of a printing machine with a plurality of slaves as bus components and a clock generator to output a first clock signal and a second clock signal to the plurality of slaves, at least one of the slaves having a selection device for selecting the first or second clock signal as the synchronization clock to be used.

Also according to the invention a method is provided for operating a bus system for controlling a component of a printing machine by outputting a first clock signal and a second clock signal to a plurality of slaves, which represent bus components, the first and second clock signals being output simultaneously and at least one of the plurality of slaves selecting the first or second clock signal present as the synchronization clock to be used.

Simultaneous transmission of the at least two clock signals or clocks allows floating and immediate switching. For a printing machine this means that switching is not associated with the threat of paper tearing or production stopping. This is extremely important in the case of time-critical newspaper printing machines, as there is frequently a time interval of only three to four hours between the start of printing when the editing process is completed and delivery of the newspapers. The invention is expected to be of enormous benefit for such areas of application.

The selection device of a slave can be configured to make an independent selection solely based on internal information. It is therefore possible for the slave to make a clock selection for example based on a time criterion. The first clock signal to arrive could therefore be accepted as the synchronization clock, while clock signals arriving later are ignored.

Alternatively the bus system according to the invention can have a control component for transmitting a clock control signal, so that the selection by the selection device of the at least one slave can be implemented on the basis of the clock control signal for one of the clock signals. This means that selection of the clock control signals can be controlled centrally by the slave and is easier to trace.

In a preferred embodiment two data lines are linked to each of the plurality of slaves of the bus system, said data lines being connected together in each slave and being connected outside each slave in such a manner that a closed communication ring is formed. This type of connection allows individual drive regulators to be exchanged during operation, i.e. when communication is ongoing. The individual drive regulators of the bus system then receive data or clock signals in each instance via half the ring, so that failure of the printing system can be prevented.

The clock generator can comprise at least two separate clock masters, one of which is configured to emit the first clock signal and another to emit the second clock signal. This embodiment has the advantage that the clock masters are physically separate and it is therefore highly unlikely that both systems will fail. The individual clock masters can thereby each be integrated in a drive regulator.

Alternatively the clock generator can however also comprise a single clock master to output both the first and the second clock signals. This can reduce system costs and the clock signal of the clock master is split into two clock signals using two lines and routed to the individual drive regulators or slaves in a physically separate fashion.

The bus system can be configured such that a bus subsystem with the same features as the bus system described above is linked to at least one of the slaves. It is therefore possible for a plurality of bus systems with a topology according to the invention to be connected together by a higher order bus system of the same or similar structure. It is then possible specifically to connect a plurality of communication rings together by means of a higher order communication ring.

A preferred application of the bus system according to the invention results for printing machines or their components in the printing industry, as mentioned above. A component of a printing machine here refers particularly to a printing unit or folding unit.

BRIEF DESCRIPTION OF THE DRAWINGS

The present invention is described in more detail below with reference to the accompanying drawings, in which.

DETAILED DESCRIPTION OF THE INVENTION

The exemplary embodiment described in more detail below represents a preferred embodiment of the present invention.

Figure 1:
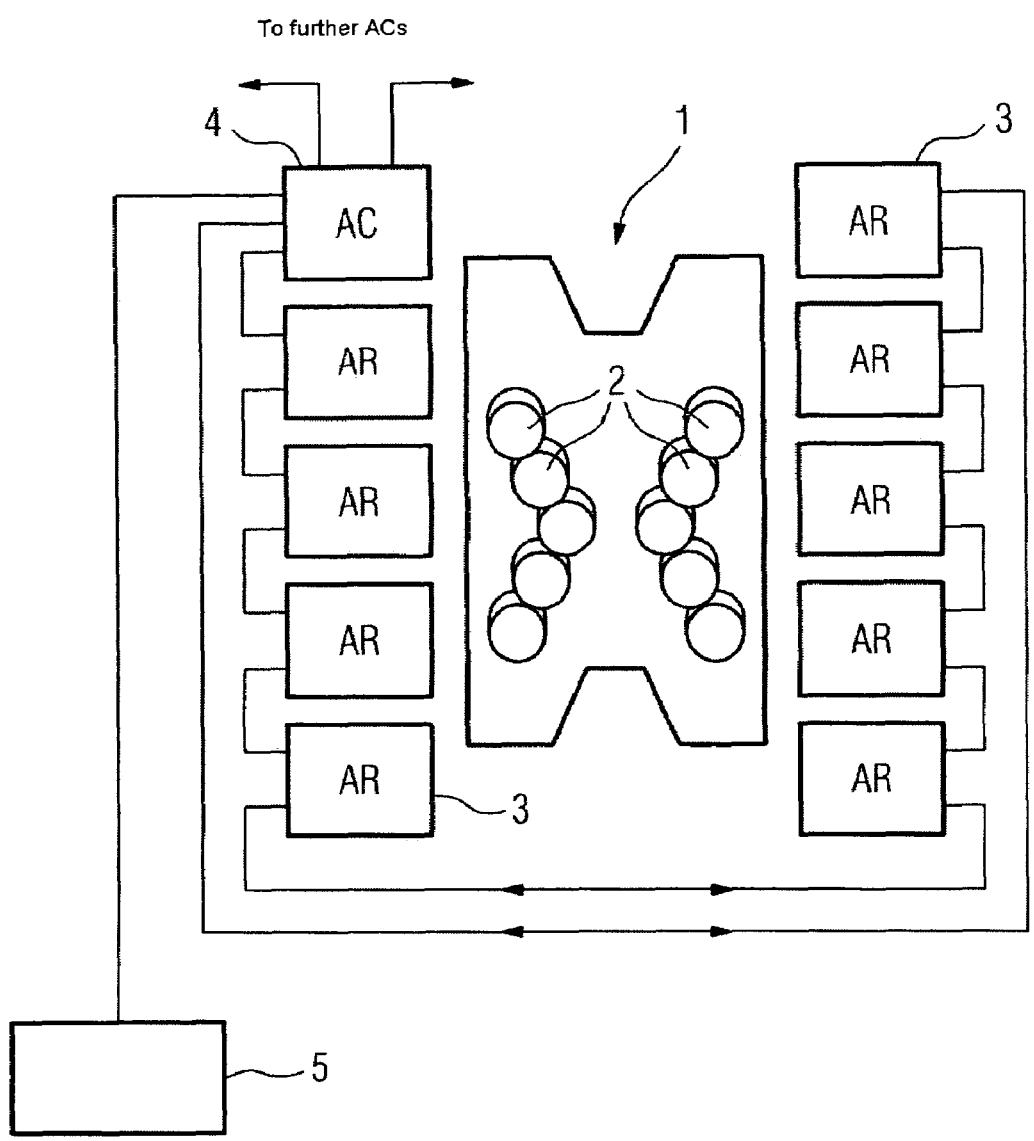
FIG. 1 shows a schematic diagram of the communication topology of an H-shaped printing system.

The printing system 1 symbolized in FIG. 1 comprises a plurality of printing cylinders 2, forming an H-shaped arrangement. Each of the printing cylinders 2 is regulated or controlled by a drive regulator AR 3. One of the drive regulators is configured as a drive controller AC 4. This drive controller 4 has the functionality of a drive regulator 3 and also control axis functionality as well as an interface for a control system 5.

The drive regulators 3 are connected in a ring structure. This means that each drive regulator 3 is connected to its two immediate neighbors. Therefore each drive regulator 3 has two connecting lines, which are designed for bi-directional data communication.

The clock signals generated by the drive controller 4, the control system 5 or a plurality of drive regulators 3 or slaves are routed via the connecting lines to the individual drive regulators 3 using two separate routes. The first route takes one direction round the communication ring and the second route takes the counter direction. To ensure the ring structure, the two connections of each drive regulator 3 are coupled together internally so that a clock signal present at one connection of the drive regulator 3 is looped through to the other connection.

Two clock signals are therefore present at each drive regulator, which can be used as the synchronization clock.

Two of the drive regulators 3 are preferably declared to be clock masters. Both send their own synchronization clock simultaneously to the other connected drive regulators 3. Each slave or drive regulator 3 can then decide itself which clock it observes. The decision is made such that the clock identified as the first is deemed to be the synchronization clock.

In an alternative embodiment, each drive regulator 3 or slave receives a signal from a higher order control system, e.g. the drive controller 4 or the control system 5, which specifies the clock to be used for synchronization.

If one of the two clock signals present fails, all the slaves switch internally to the other clock signal or the other clock master. Depending on the embodiment, this switch is based solely on the fact that a second clock signal is no longer present or it is based on the control signal from the higher-order unit.

The communication ring shown in the Figure now has the advantage that any drive regulator 3 can be removed from the bus system, i.e. the communication ring, without interrupting the synchronization clock. This is because each drive regulator 3 receives a clock signal from two sides, i.e. via the two halves of the ring, and if half fails, a clock signal is always still pre-sent at the respective drive regulator 3 via the other side of the ring. This results in redundancy via the closed communication ring through the second communication channel. The redundancy thereby results at a physical level from the two connections at each drive regulator 3.

As already stated, a drive regulator 3 can be removed or withdrawn from the system, if it is defective for example. With the communication topology shown in the Figure, two immediately adjacent drive regulators 3 can also be removed from the system without any adverse effect for the other drive regulators. Two drive regulators that are apart from each other could however not be withdrawn from the system, as the drive regulators in between would not then receive the clock.

Each drive regulator switches to the respective clock or evaluates the two clock signals present in an independent fashion. Therefore the drive regulators in the printing system can be synchronized with different clocks during operation.

Figure 2:
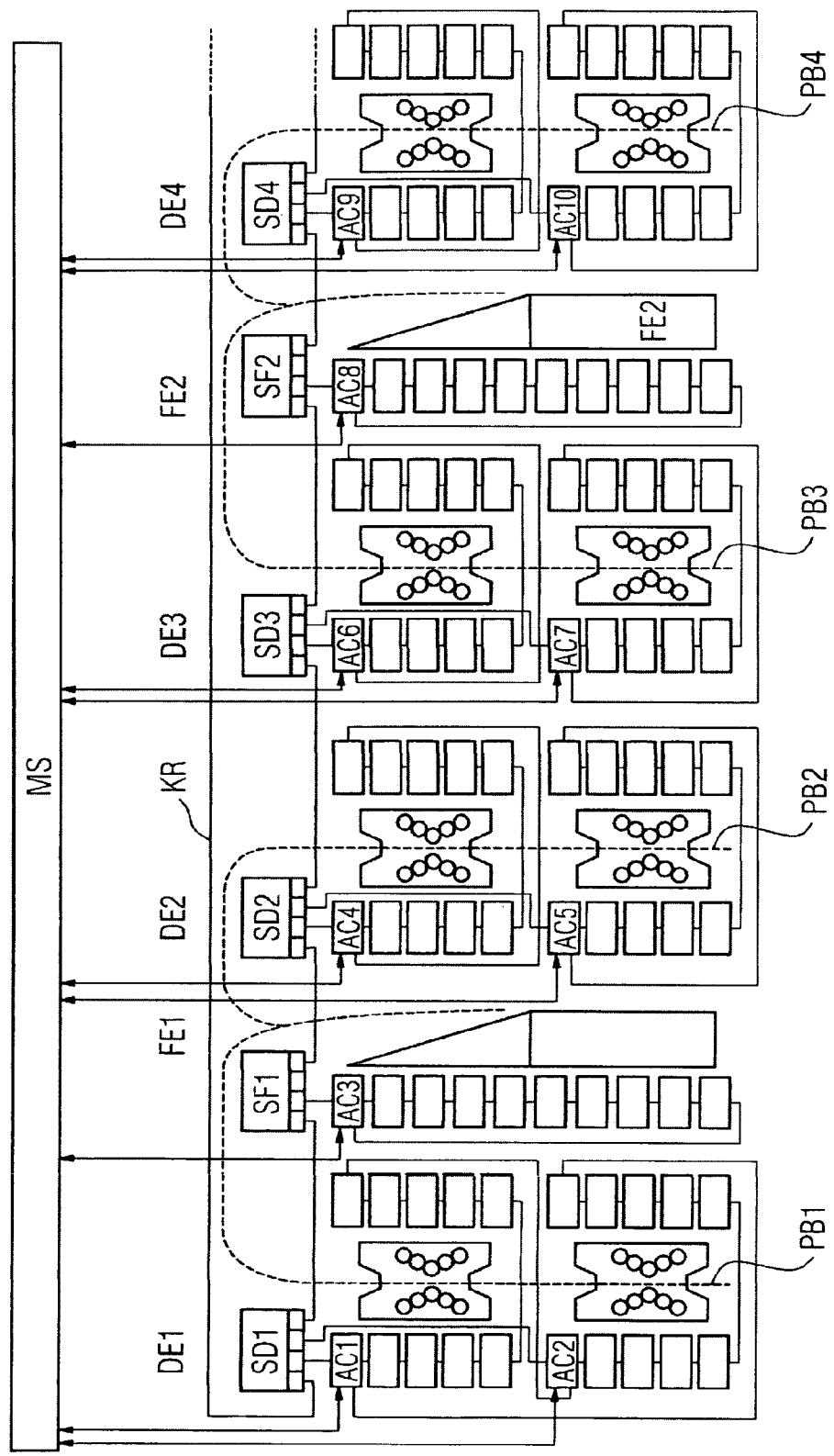
FIG. 2 shows a communication topology of a newspaper printing machine also in schematic diagram form.

FIG. 2 shows an example of a communication topology of a newspaper printing machine. The printing machine shown here in schematic form comprises at least eight printing systems, as shown in FIG. 1. Two printing systems respectively are combined to form a printing unit DE1, DE2, DE3 and DE4. A folding unit FE1 and FE2 is arranged between each set of two printing units. These process the paper from the printing units further. Corresponding paper paths PB1, PB2, PB3 and PB4 are shown in FIG. 2.

Each of the printing systems and each folding unit has a ring-shaped bus system. Each of these individual bus systems shown in FIG. 2 has a drive controller AC1 to AC10. A switch SD1, SF1, SD2, SD3, SF2, SD4 is provided in each printing unit DE1 to DE4 and folding unit FE1, FE2. The switch in each printing or folding unit controls the work controller(s) of this unit. The switches SD1, SF1, SD2, SD3, SF2 and SD4 are for their part connected in a ring shape to a machine communication ring KR. The communication sub-rings of the individual printing systems or folding units are thereby connected together by means of the higher-order machine communication ring KR. A central machine control system MS is connected in a bi-directional fashion to the individual drive controllers A1 to A10. This topology according to the invention ensures that a plurality of clock signals are available for selection not only within a bus system of a printing system or a folding unit but also within a higher-order communication ring KR, which coordinates the interaction of the individual units of the newspaper printing machine. According to the invention it is therefore possible to reduce the probability of failure of every component at each system level.

The invention claimed is:

1. A bus system for controlling a component of a printing machine, the bus system comprising:
    a plurality of slaves on a bidirectional ring topology data communications bus;
    a first master clock generator in a first one of the slaves for outputting a first master clock signal onto the bus;
    a second master clock generator in a second one of the slaves for outputting a second master clock signal onto the bus; wherein
    both clock generators send their clock signals simultaneously onto the bus to the connected slaves;
    the bus is connected from slave to slave in a ring topology, so that each slave is connected to the bus from two directions, each of which direction provides at least one of the two master clock signals; and
    each of the slaves has an independent selection device for selecting the first or second master clock signal as the synchronization clock to be used, based solely on the master clock signals received;

whereby any one of the slaves, or any two immediately adjacent slaves on the bus, including either one of the master clock slaves, can be removed or can malfunction, without eliminating master clocking of the other slaves, because the bus remains continuous in one direction to each of the remaining slaves despite said removal or malfunction, so at least one of the master clock signals is available to each of the remaining slaves, and whereby the remaining slaves will self-resynchronize as needed if one master clock generator is lost.

2. The bus system of claim 1, wherein the slaves are drive regulators on the printing machine.

3. The bus system according to claim 2, wherein the component is a printing unit or a folding unit.

4. The bus system according to claim 1, wherein the selection device is configured to select the first or second clock signal based solely on which of the two clock signals is the first to arrive at the selection device.

5. The bus system according to claim 1, wherein the bus system is a first bus system, and further comprising a second bus system (KR) connected to a controller (AC1) on the first bus system.

* * * * *